Patented July 14, 1936

2,047,874

UNITED STATES PATENT OFFICE 2,047,874

METHOD OF AND MATERIAL FOR FORCING FLOWERING AND FRUIT FORMATION IN PLANTS

Kenneth R. Kerns, Wahiawa, Territory of Hawaii

No Drawing. Application June 18, 1935, Serial No. 27,159½

9 Claims. (Cl. 47—58)

My invention relates to methods of forcing plants to flower and bear fruit, and it is more particularly concerned with methods of and materials for causing pineapple plants to flower and mature sooner than they otherwise would, but it is to be understood that the invention is not limited for use with pineapple plants.

In the pineapple raising industry it has been found that in many instances, either by reason of the age or the particular variety of the pineapple plant or the climatic and soil conditions of the area in which the plants are grown, or both, the plants fail to flower at the proper season, and this difficulty is especially pronounced in the production of a second (ratoon) crop from the original plants. A large area of such "non-productive" plants entails the expenditure of considerable sums in land rental and fertilization, pest control and weeding, and it is the major object of my invention to devise methods of stimulating or forcing pineapple or other similar plants to flower and bear fruit much sooner than they otherwise would.

It is another object of my invention to devise methods of producing the materials employed in the plant forcing method of this invention.

Further objects of this invention will become apparent as the specification thereof proceeds, and from the appended claims.

The method in general comprises treating plants with an unsaturated hydrocarbon such as acetylene. The plants may be treated with acetylene in several different ways. Two methods have been tried and have been found to give excellent results. One method consists of establishing an acetylene gas atmosphere about the plants, while the other consists of applying an aqueous solution of acetylene directly to the plants.

I have found that by treating pineapple plants in accordance with either of the above methods at any time before their normal flowering time, flowers were produced within three months after treatment, whereas plants of similar age located in the same vicinity, but which were not treated, did not produce flowers until twelve months later. The invention thus enables all the plants in a given area to be brought into fruit at the proper season.

It is believed that the effectiveness of acetylene in producing flower and fruit formation resides in the fact that it is of an unsaturated chemical nature, which permits it to readily enter into chemical reactions with cellular substances when it is taken into the plant. Although I have found acetylene to be fully operative and I prefer to use this material because of its comparative cheapness and the small amount required, it is to be understood that other unsaturated hydrocarbons falling within the scope of the invention are intended to be embraced by the claims.

I give as specific examples of the method of carrying out my invention the following examples:

1. For treatment with acetylene (CH:CH) as a gas mixed with air, the plants to be treated are placed, at a suitable time prior to their normal flowering time, in a tight container into which is then introduced a sufficient quantity of acetylene gas to produce a concentration of acetylene gas within the following range of concentrations: 1:50, 1:100 and 1:200. The plants are left in the closed chamber for 12 to 18 hours, and at the end of this time the chamber is opened. This operation is repeated on successive or alternate days for approximately five treatments, after which the plants are allowed to mature in the usual way.

2. For treatment of plants with water containing acetylene, the gas is bubbled through water in any suitable containers until the water becomes saturated and gives off the strong odor which is characteristic of acetylene gas. The saturated solution of acetylene is then sprayed, or poured in any suitable manner onto the plants, at a suitable time prior to their normal flowering time, in quantities ranging from 10 cc. to 100 cc. If desired however, greater quantities of an only partially saturated solution of acetylene may be used if desired without departing from the spirit of the present invention. These applications are repeated for approximately five times on successive or alternate days.

3. Ethylene, ($C_2H_4$) may be employed instead of acetylene, and it may be utilized in gaseous form, in accordance with Example 1, or it may be dissolved in water and applied to the plants, in accordance with Example 2.

Although I preferably employ five applications of the accelerating compounds, as it will, in the case of pineapple plants, bring them into flower in approximately three months if they are treated any time before their normal flowering time, if desired, only one or more treatments may be used, but in such case the acceleration will not be as great as when five treatments are given.

Although I have disclosed my invention in connection with pineapple plants, and I find it particularly useful in such industry, it is to be understood that it is not limited to such use. For instance, I have found that plants of the genus Bilbergia can also be made to flower prematurely by the treatments set forth in the examples in connection with pineapple plants, and the appended claims are intended to embrace my invention when it is employed in conjunction with such plants and any other plants which respond to the treatments thereof.

I claim as my invention:

1. In a method for forcing flowering in plants, the step of contacting said plant with an aqueous solution of an unsaturated hydrocarbon.

2. In a method of accelerating the growth of growing pineapple plants and plants of the genus Bilbergia, the step which comprises contacting said plants with acetylene.

3. In a method of accelerating the maturity of growing pineapple plants and plants of the genus Bilbergia, the step of contacting said plants with acetylene in gaseous form.

4. In a method of accelerating the maturity of plants, the step of contacting said plants with an aqueous solution of acetylene.

5. In a method of accelerating the maturity of growing pineapple plants and plants of the genus Bilbergia, the steps of contacting said plants with acetylene, and again contacting said plants with acetylene a predetermined number of times.

6. The method of accelerating flowering in growing pineapple plants, which comprises contacting said plants with acetylene.

7. As a new article of manufacture, a material for forcing flowering in plants comprising an unsaturated hydrocarbon dissolved in a liquid, carrying medium.

8. As a new article of manufacture, a material for forcing flowering in plants comprising an aqueous solution of acetylene.

9. A method of forcing flowering in growing pineapple plants and plants of the genus Bilbergia, which comprises subjecting them to an atmosphere containing gaseous acetylene in a concentration of at least 1 part acetylene to 200 parts air.

KENNETH R. KERNS.